F. Wagner.

Liquid Meter.

No. 4,040. Reissued June 21, 1870.

Witnesses

Henry E. Roeder.

Louis Stumm.

Inventor.

Franz Wagner.

N. PETERS, PHOTO-LITHOGRAPHER, WASHINGTON, D. C.

United States Patent Office.

JOSE F. DE NAVARRO, OF NEW YORK, N. Y., ASSIGNEE BY MESNE ASSIGNMENTS OF FRANZ WAGNER.

*Letters Patent No.* 99,266, *dated January* 25, 1870; *reissue No.* 4,040, *dated June* 21, 1870.

IMPROVEMENT IN LIQUID-METERS.

The Schedule referred to in these Letters Patent and making part of the same

*To all whom it may concern:*

Be it known that the following is a full, clear, and exact description of a new and useful Improvement in Water-Meters, invented by FRANZ WAGNER, of the city, county, and State of New York, reference being had to the accompanying drawing and to the letters of reference marked thereon.

Like letters of reference indicate similar parts in all the figures.

Figure 3:
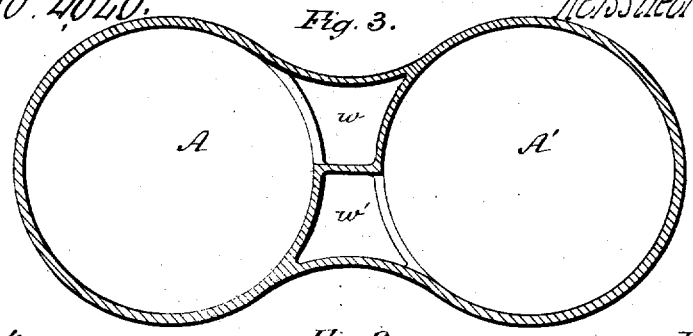
Figure 3 is a vertical section of the cylinders and passages between them.
Figure 4:
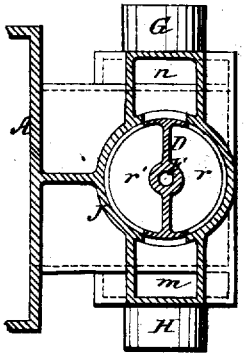
Figures 4 and 5 are sections of the valve-chamber and valve, taken transversely through opposite ends of said chamber.
Figure 2:
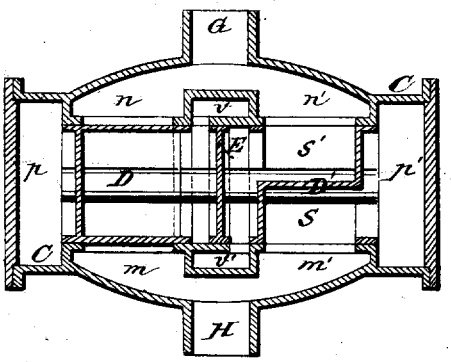
Figure 2 is a vertical section of the valve-chamber and valves applicable to said meter, or forming part thereof.
Figure 5:
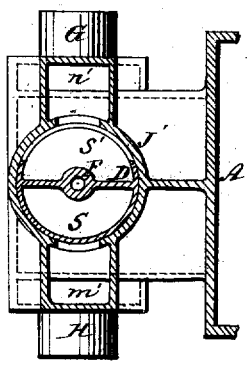
Figure 1:
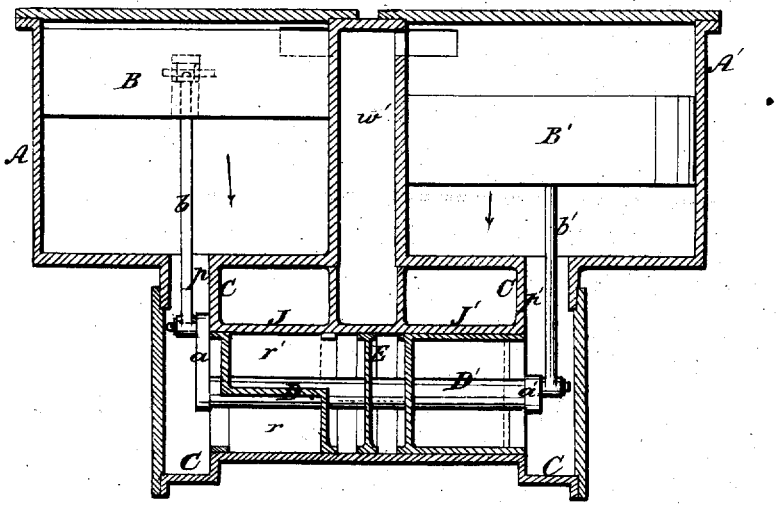
Figure 1 represents a horizontal section of the improved water-meter under a double form of construction.

This invention relates to a meter for measuring water or any other fluid, and consists of one or more pistons working in a suitable cylinder or cylinders, and connected, through a piston-rod or rods, with a circular valve, which, as the piston or pistons is or are reciprocated by the fluid acting upon it or them, is rotated, and the necessary change thereby made in the direction of the fluid.

In the accompanying drawing the improved meter is shown as duplicated in its working parts, including two cylinders, two pistons, and two valves or double form of single valve, together with passages and parts to correspond, the pistons being set so that one is at half-stroke when the other is at the end of its stroke; but a different arrangement or single construction, that is, only one cylinder, one piston and valve, with parts and passages to correspond, may be used instead, if preferred.

It will suffice here, however, to describe the meter with its operating parts duplicated, a like construction and action applying to them, if single.

In the drawing—

A A′ represent the cylinders, into which the pistons B B′ are fitted.

These cylinders have the valve-chest C attached to one end.

The valves D D′, with their dividing-disk E, are attached to a common shaft or spindle, F, having at each end a crank, *a a′*, attached, to which the piston-rods *b b′* are connected, at an angle of about ninety degrees, more or less, to each other.

The valves D D′, with their dividing-disk E, are ground into their respective seats J J′ in the valve-chest C, and the valve-chest C is arranged with suitable passage-ways *n n′*, forming a communication between the inlet or supply-pipe G and the interior of the valves D and D′, as well as with suitable passage-ways *m m′*, forming a communication between said valves and the discharge-pipe H; and further, this valve-chest C has suitable passage-ways *v v′*, so arranged and connected with passage-ways *w w′* as to form a communication between the inner ends of the valves D D′ and the rear ends of the cylinders A A′ behind their respective pistons, while the outer ends of said valve-chest C are in direct communication with the forward ends of the cylinders A A′ by passages *p p′*, and through which passages *p p′* the piston-rods *b b′* pass, to connect with the cranks *a a′*, to give the necessary and required rotation to the valves D D′.

The registering apparatus may be placed on either end of the valve-chest, and may be operated by a suitable lever connected with the crank-pin of the crank *a* or *a′*.

The valves D and D′ are constructed with two chambers, *r r′* and *s s′*, respectively, each of which connects either with the opening in communication with the supply-pipe, and one or the other end of the passage leading to the cylinder, or with the opening in communication with the discharge-pipe, and the one or the other end of the passage into the cylinder, according to the position of said valve.

When the pistons occupy the position represented in the drawing, the fluid before the piston B will pass through the chamber *r* in the valve D into the passage *m* and discharge-pipe H, while the fluid from the supply-pipe G will pass through the passage-way *n* into the chamber *r′* in the valve D, and through the end of said valve into the passage *v*, through the passage *w* into the cylinder A behind the piston B, acting upon said piston so as to propel it in the direction indicated by the arrow.

At the same time the fluid from the supply-pipe G passes through the passage *n′* through the chamber *s′* in the valve D′, through the end of said valve into the passage *v′*, through the passage *w′* into the cylinder A′ behind the piston B′, acting upon said piston so as to propel it in the direction indicated by the arrow, and at the same time assist the passage of the crank *a*, to which the piston B is connected over the center, while the fluid before the piston B′ will pass through the passage *p′*, the chamber *s* in the valve D′, through the passage *m′* into the discharge-pipe H.

When the pistons reach the end of their stroke, the position of the respective valves is thereby changed, and the fluid passes in the contrary direction.

By these means a fluid-meter is obtained, wherein the valve or valves is or are self-operating, without the assistance of any extra lever or springs, and which operates with very little pressure, and independent of any head under which the fluid enters to or discharges from the meter. All the friction created by the working parts is easily overcome, and no fluid can pass through the meter unless it is measured.

This meter may be placed on the ground-floor of a building, and it will indicate the water drawn from any of the faucets in the house.

What is here claimed, and desired to be secured by Letters Patent, is—

1. The arrangement of the rotating valve or valves D or D D′, connected, through a suitable rod or rods *b* or *b b′*, with a reciprocating piston or pistons B or B B′, and operating in the manner and for the purpose substantially as described.

2. The rotating valve or valves D or D D′, with its or their respective chambers *r r′* or *r r′* and *s s′*, in combination with the passage-ways *n*, *m*, and *v*, or *n n′*, *m m′*, and *v v′*, and communicating, through the passages *p* and *w*, or *p p′* and *w w′*, with the ends of the cylinder or cylinders A or A A′, the whole being arranged substantially as and for the purpose set forth.

JOSE F. DE NAVARRO.

Witnesses:
FRED. HAYNES,
W. MORRIS SMITH.